US011431717B2

(12) United States Patent
Fujimaki

(10) Patent No.: US 11,431,717 B2
(45) Date of Patent: Aug. 30, 2022

(54) INFORMATION PROCESSING APPARATUS, INFORMATION PROCESSING SYSTEM, AND NON-TRANSITORY COMPUTER READABLE MEDIUM STORING INFORMATION PROCESSING PROGRAM FOR ALLOWING OPERATION WITHIN PREDETERNINED AUTHORITY RANGE FOR TEMPORARY USER

(71) Applicant: FUJIFILM Business Innovation Corp., Tokyo (JP)

(72) Inventor: Yoshihiro Fujimaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 212 days.

(21) Appl. No.: 16/505,602

(22) Filed: Jul. 8, 2019

(65) Prior Publication Data
US 2020/0280563 A1 Sep. 3, 2020

(30) Foreign Application Priority Data
Feb. 28, 2019 (JP) .............................. JP2019-035282

(51) Int. Cl.
*H04L 9/40* (2022.01)
(52) U.S. Cl.
CPC ........ *H04L 63/102* (2013.01); *H04L 63/0884* (2013.01)
(58) Field of Classification Search
CPC ........................... H04L 63/102; H04L 63/0884
See application file for complete search history.

(56) References Cited

U.S. PATENT DOCUMENTS

| 6,073,119 A * | 6/2000 | Bornemisza-Wahr ...................... G06Q 20/108 705/42 |
| 7,480,934 B2 * | 1/2009 | Chan ...................... G06F 21/41 709/204 |
| 9,135,457 B1 * | 9/2015 | Arnaudov ............. G06F 21/604 |
| 10,635,508 B1 * | 4/2020 | Allen ..................... G06F 17/40 |
| 2003/0182586 A1 * | 9/2003 | Numano ................. G06F 21/31 726/4 |
| 2004/0260651 A1 * | 12/2004 | Chan ...................... G06F 21/41 705/50 |
| 2009/0150985 A1 * | 6/2009 | Chan ...................... H04L 67/02 726/8 |
| 2010/0083253 A1 * | 4/2010 | Kushwaha ......... G06Q 10/0631 718/100 |
| 2010/0175104 A1 * | 7/2010 | Khalid .................... G06F 21/53 726/1 |

(Continued)

FOREIGN PATENT DOCUMENTS

JP 2003280781 10/2003

*Primary Examiner* — Jason Chiang
(74) *Attorney, Agent, or Firm* — JCIPRNET

(57) ABSTRACT

An information processing apparatus includes a reception unit that receives command information related to an operation by a temporary user, and a control unit that performs a control to execute an operation corresponding to the command information received by the reception unit in a case where the operation corresponding to the command information is included in authority of the user by switching authority of the user to authority of a user who is not a temporary user after the command information from the user is received by the reception unit.

15 Claims, 6 Drawing Sheets

(56) References Cited

U.S. PATENT DOCUMENTS

| | | | | |
|---|---|---|---|---|
| 2012/0072669 | A1* | 3/2012 | Nishiguchi | G06F 12/1027 |
| | | | | 711/135 |
| 2012/0185933 | A1* | 7/2012 | Belk | H04W 12/12 |
| | | | | 726/17 |
| 2013/0086630 | A1* | 4/2013 | Kavantzas | H04L 63/10 |
| | | | | 726/1 |
| 2013/0198516 | A1* | 8/2013 | Fenton | G06F 21/31 |
| | | | | 713/168 |
| 2015/0039319 | A1* | 2/2015 | Mei | G10L 15/1822 |
| | | | | 704/275 |
| 2016/0092692 | A1* | 3/2016 | Iwahashi | G06F 16/25 |
| | | | | 726/28 |
| 2018/0349625 | A1* | 12/2018 | Ikram | H04L 63/08 |
| 2019/0324826 | A1* | 10/2019 | Abuelata | G06F 3/048 |

* cited by examiner

FIG. 5

```
<OPERATION>
  <OPERATION EXECUTION USER>tempUser 001</OPERATION EXECUTION USER>
  <OPERATION ID>1</OPERATION ID>
  <COMMAND>editFile</COMMAND>
  <INDEX>
    <TARGET OBJECT>file://xxx.doc</TARGET OBJECT>
  </INDEX>
</OPERATION>
```

FIG. 6A

| OPERATION ID | EXECUTION ACCOUNT | COMMAND | INDEX | EXECUTION STATUS | ERROR OF OPERATION WITH "COMPLETION" EXECUTION STATUS |
|---|---|---|---|---|---|
| 1 | tempUser001 | editFile | file://xxx.doc | COMPLETION | NO ERROR |
| 2 | tempUser002 | editFile | file://xxx.doc | COMPLETION | "Conflict IS DETECTED DURING EXECUTION OF editFile. THE CONTENTS BY EXECUTION OF editFile ARE DISCARDED." |

FIG. 6B

| OPERATION ID | EXECUTION ACCOUNT | COMMAND | INDEX | EXECUTION STATUS | ERROR OF OPERATION WITH "COMPLETION" EXECUTION STATUS |
|---|---|---|---|---|---|
| 1 | tempUser00A | editFile | file://yyy.doc | COMPLETION | NO ERROR |
| 2 | tempUser00B | editFile | file://yyy.doc | COMPLETION | "Conflict IS DETECTED DURING EXECUTION OF editFile. THE CONTENTS BY EXECUTION OF editFile ARE HELD." |

FIG. 7A

```
<RULE>
  <CONDITION>(COMMAND==editFile)&&(ERROR==CONFLICT)</CONDITION>
  <ACTION>DISCARD CONTENTS BY EXECUTION OF editFile</ACTION>
</RULE>
```

FIG. 7B

```
<RULE>
  <CONDITION>(COMMAND==editFile)&&(ERROR==CONFLICT)</CONDITION>
  <ACTION>HOLD CONTENTS BY EXECUTION OF editFile</ACTION>
</RULE>
```

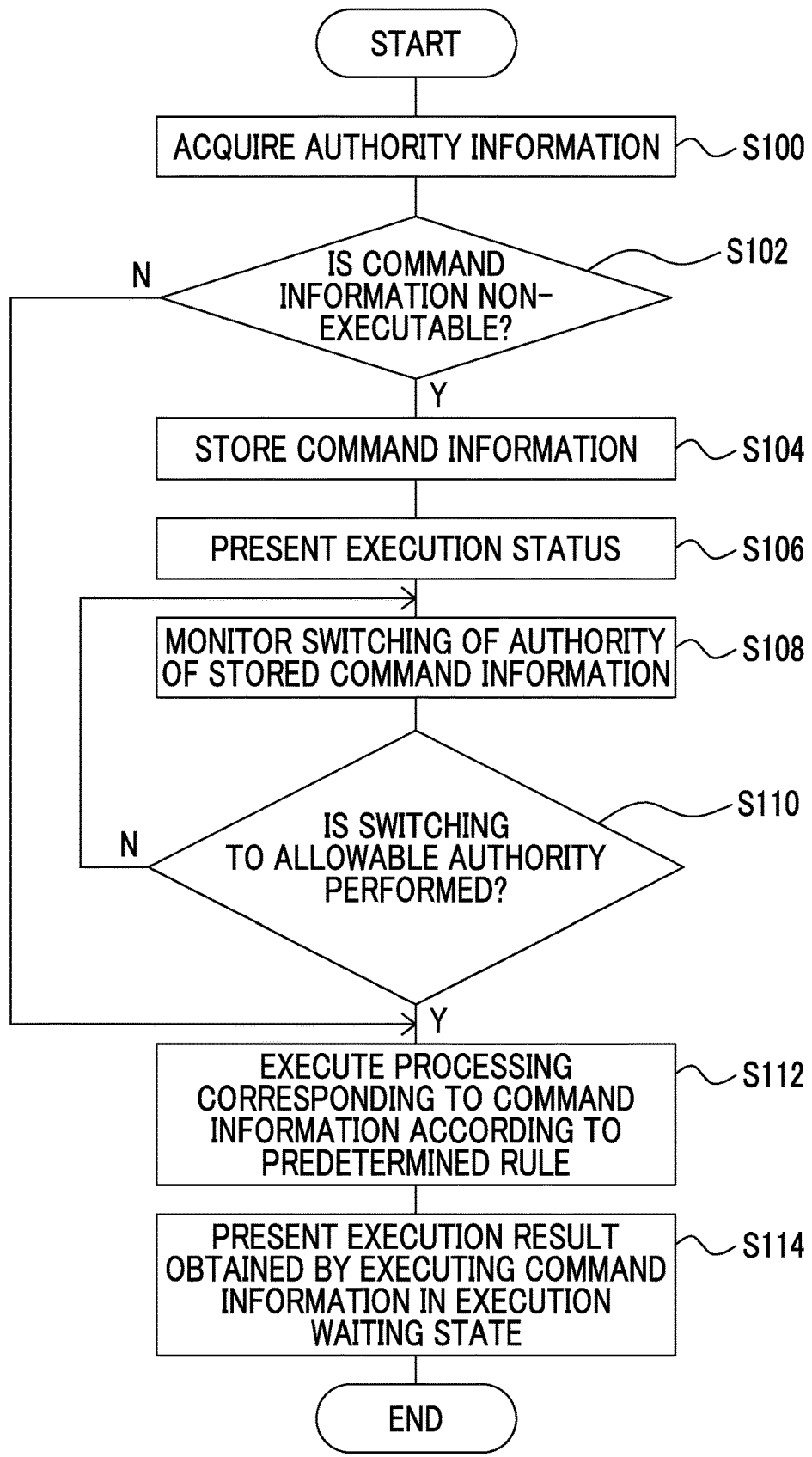

INFORMATION PROCESSING APPARATUS, INFORMATION PROCESSING SYSTEM, AND NON-TRANSITORY COMPUTER READABLE MEDIUM STORING INFORMATION PROCESSING PROGRAM FOR ALLOWING OPERATION WITHIN PREDETERNINED AUTHORITY RANGE FOR TEMPORARY USER

CROSS-REFERENCE TO RELATED APPLICATIONS

This application is based on and claims priority under 35 USC 119 from Japanese Patent Application No. 2019-035282 filed Feb. 28, 2019.

BACKGROUND (i) Technical Field

The present invention relates to an information processing apparatus, an information processing system, and a non-transitory computer readable medium storing an information processing program.

(ii) Related Art

JP2003-280781A proposes a technique in which, when an execution of a user switching function is requested by a user, a user switching control program limits a user authority level of the user that the user can select as a switching target user, to a level equal to or lower than a specific user authority level, according to the user authority level of the user who requests the user switching.

SUMMARY

There is proposed a technique of allowing an operation within a predetermined authority range even in a case where the user is not a regular user but a temporary user. However, there is room for improvement because the temporary user may not be able to instruct an operation exceeding the predetermined authority. Aspects of non-limiting embodiments of the present disclosure relate to an information processing apparatus, an information processing system, and a non-transitory computer readable medium storing an information processing program capable of instructing an operation exceeding predetermined authority given to a temporary user.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including: a reception unit that receives command information related to an operation by a temporary user; and a control unit that performs a control to execute an operation corresponding to the command information received by the reception unit in a case where the operation corresponding to the command information is included in authority of the user by switching authority of the user to authority of a user who is not a temporary user after the command information from the user is received by the reception unit.

BRIEF DESCRIPTION OF THE DRAWINGS

Exemplary embodiment(s) of the present invention will be described in detail based on the following figures, wherein:

FIG. 5 is a diagram illustrating an example of command information indicating an execution of an operation;

FIG. 6A illustrates an example of a rule for discarding edited contents of a file in a case where command information for editing the file is repeated;

FIG. 6B illustrates an example of a rule for holding edited contents of a file in a case where command information for editing the file is repeated;

FIG. 7A illustrates an example of rule information indicating the rule for discarding the edited contents of the file in a case where command information for editing the file is repeated;

FIG. 7B illustrates an example of rule information indicating the rule for holding the edited contents of the file in a case where command information for editing the file is repeated; and FIG. 8 is a flowchart illustrating an example of a flow of processing performed by the cloud server of the information processing system according to the exemplary embodiment.

DETAILED DESCRIPTION

Figure 1:
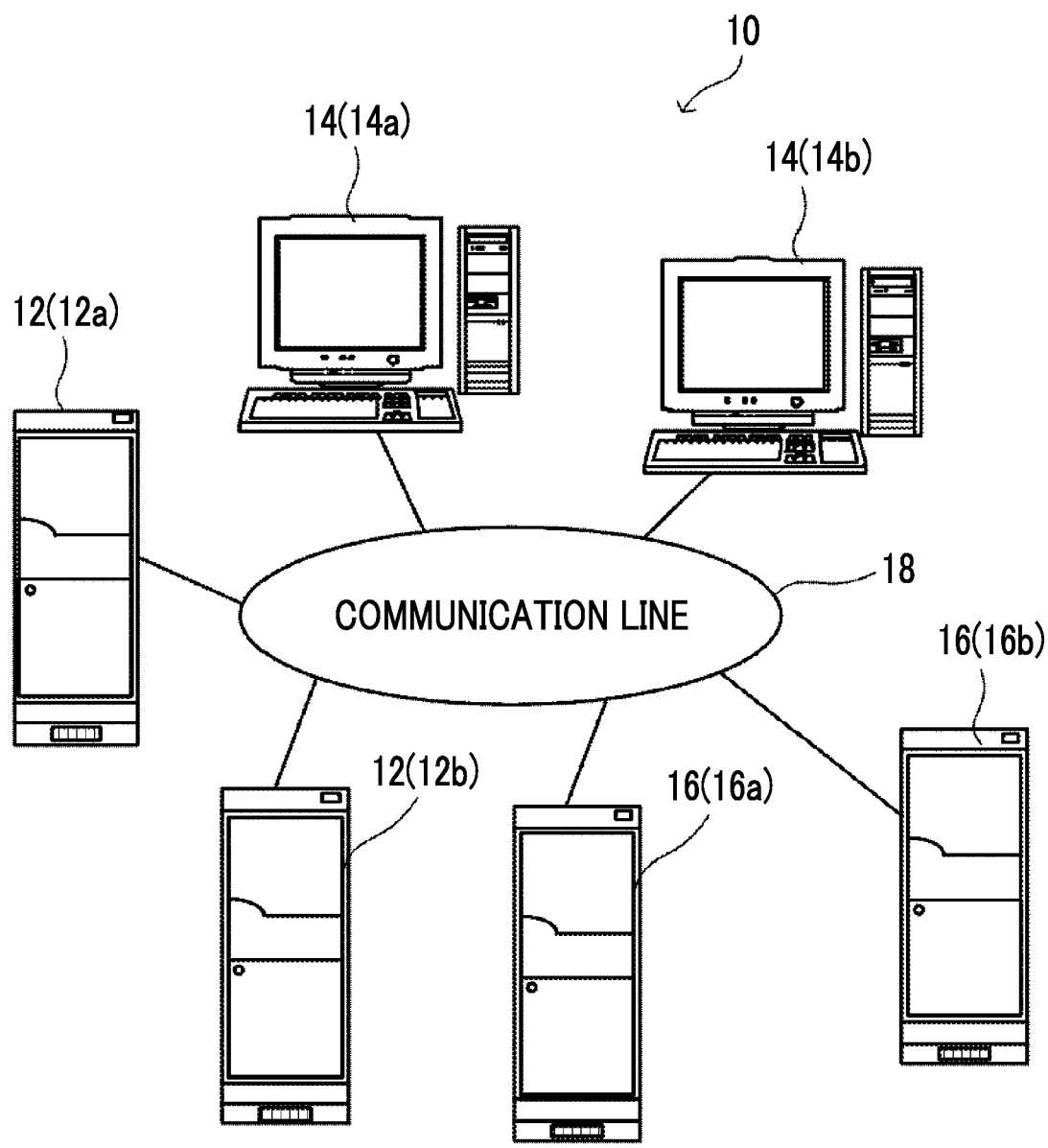
FIG. 1 is a diagram illustrating a schematic configuration of an information processing system according to an exemplary embodiment.

Hereinafter, an example of an exemplary embodiment will be described in detail with reference to the accompanying drawings. In the exemplary embodiment, an information processing system in which a plurality of information processing terminals, a plurality of authentication servers, and a plurality of cloud servers are connected to each other via a communication line such as a network will be described as an example. FIG. 1 is a diagram illustrating a schematic configuration of an information processing system 10 according to the exemplary embodiment.

As illustrated in FIG. 1, the information processing system 10 according to the exemplary embodiment includes a plurality of authentication servers 12a, 12b, . . . , a plurality of information processing terminals 14a, 14b, . . . , and a plurality of cloud servers 16a, 16b, . . . . In a case where there is no need to distinguish the authentication servers 12a, 12b, . . . , the information processing terminals 14a, 14b, . . . , and the cloud servers 16a, 16b, . . . , alphabets at the end of the numerals may be omitted. In the exemplary embodiment, an example in which the plurality of authentication servers 12a, 12b, . . . , the plurality of information processing terminals 14a, 14b, . . . , and the plurality of cloud servers 16a, 16b, . . . are included will be described. On the other hand, the number of each of the authentication servers, the information processing terminals, and the cloud servers is not limited to plurality, and may be one. The authentication server 12 corresponds to an authentication apparatus, and the cloud server 16 corresponds to an information processing apparatus.

The authentication server 12, the information processing terminal 14, and the cloud server 16 are connected to each other via a communication line 18 such as a local area network (LAN), a wide area network (WAN), the Internet, or an intranet. Thus, various data can be transmitted and received between the authentication server 12, the information processing terminal 14, and the cloud server 16 via the communication line 18.

In the information processing system 10 according to the exemplary embodiment, the cloud server 16 provides a cloud service. The authentication server 12 manages an account of a user who uses the cloud service. The user performs authentication by the authentication server 12 by operating the information processing terminal 14, and thus the user can use the cloud service. For example, as in OAuth 2 or the like, the user can use a cloud service by using a mechanism in which specific operations to specific information are permitted. Examples of cloud services include a file editing service, a file storing service, a file conversion service into a predetermined format, a translation service, a text recognition service, and the like, and are not limited thereto.

In the exemplary embodiment, in a case of using a cloud service provided by the cloud server 16, the user is permitted to use the cloud service after authentication by the authentication server 12. In a case where a user who is not authenticated by the authentication server 12 uses a cloud service, the user is considered as a temporary user, and is permitted to use the cloud service within a predetermined authority range.

Figure 2:
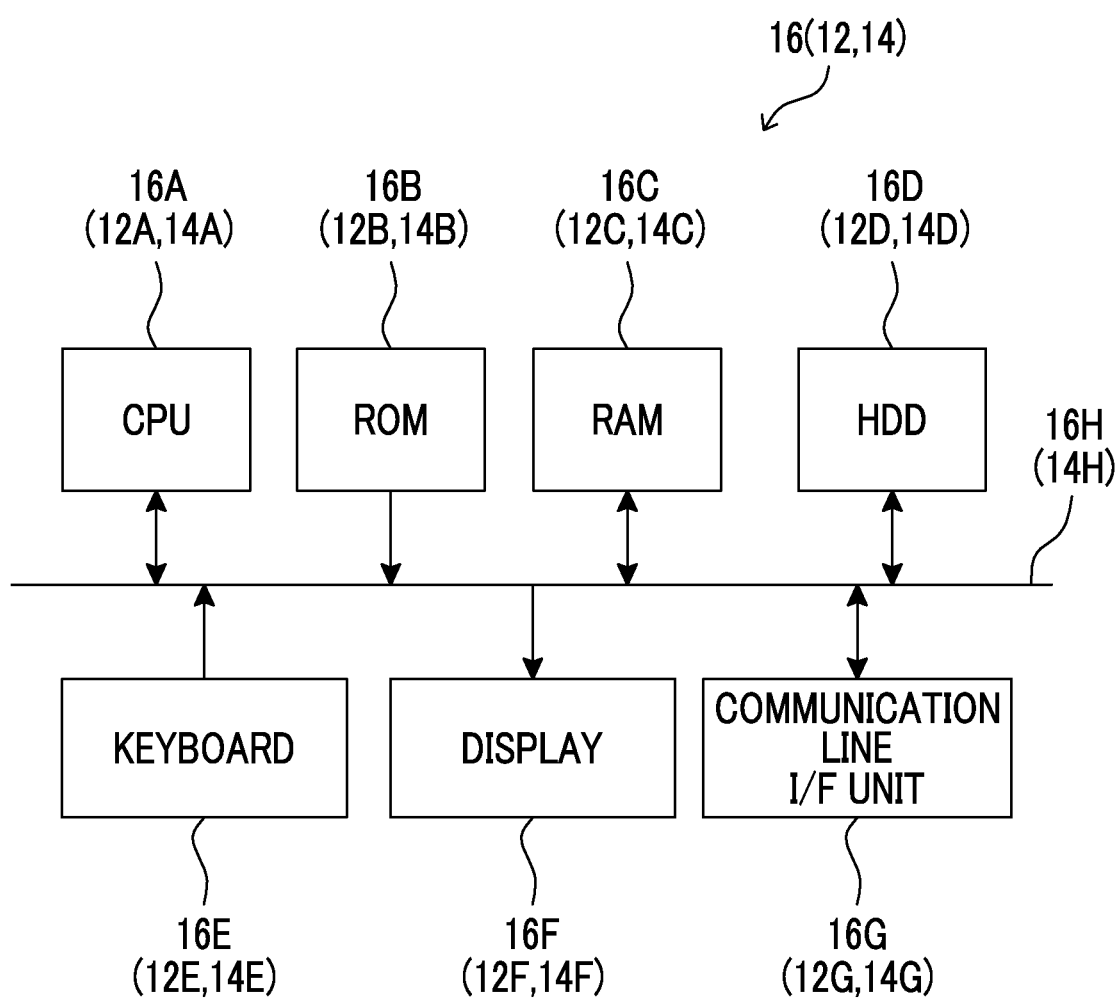
FIG. 2 is a block diagram illustrating a main configuration of an electrical system of each of an authentication server, an information processing terminal, and a cloud server according to the exemplary embodiment.

Next, a main configuration of an electric system of each of the authentication server 12, the information processing terminal 14, and the cloud server 16 according to the exemplary embodiment will be described. FIG. 2 is a block diagram illustrating a main configuration of an electrical system of each of the authentication server 12, the information processing terminal 14, and the cloud server 16 according to the exemplary embodiment. The authentication server 12, the information processing terminal 14, and the cloud server 16 are basically configured with general computers. Thus, in this description, the cloud server 16 will be representatively described.

As illustrated in FIG. 2, the cloud server 16 according to the exemplary embodiment includes a CPU 16A, a ROM 16B, a RAM 16C, an HDD 16D, a keyboard 16E, a display 16F, and a communication line interface (I/F) unit 16G. The CPU 16A controls the entire operation of the cloud server 16. The ROM 16B stores various control programs and various parameters in advance. The RAM 16C is used as a work area or the like when the CPU 16A executes various programs. The HDD 16D stores various data, application programs, and the like. The keyboard 16E is used to input various information. The display 16F is used to display various information. The communication line I/F unit 16G is connected to the communication line 18, and transmits and receives various data to and from other apparatuses connected to the communication line 18. The units of the cloud server 16 are electrically connected to each other by a system bus 16H. In the cloud server 16 according to the exemplary embodiment, the HDD 16D is used as a memory unit. On the other hand, the present disclosure is not limited thereto, and a non-volatile memory unit such as a flash memory may be used.

With the configuration, in the cloud server 16 according to the exemplary embodiment, the CPU 16A accesses each of the ROM 16B, the RAM 16C, and the HDD 16D, acquires various data via the keyboard 16E, and displays various information on the display 16F. Further, in the cloud server 16, the CPU 16A controls transmission and reception of communication data via the communication line I/F unit 16G.

On the other hand, in the information processing system 10 with the above-described configuration, a user registers in the authentication server 12 by operating an apparatus such as the information processing terminal 14, and thus the user can use the cloud service provided by the cloud server 16. Further, even when the user is not registered, in a case where an account of a temporary user is created in advance and identification information of the temporary user is presented in accordance with a request of the user, the user can instruct an operation to the cloud service within a predetermined authority range.

On the other hand, such a temporary user may not perform a desired operation because only minimum authority is given to the temporary user. For example, there is a case where document reading is allowed but updating is not allowed. Or, there is a case where a size of a document storage area is limited so that an upper limit value is exceeded in a short period of time, and as a result, a temporary user may not use the document storage area. In this way, even though a temporary user with minimum authority has an account for using a cloud service, eventually, the temporary user cannot use the cloud service. As a result, an original purpose of the temporary user cannot be achieved.

Figure 3:
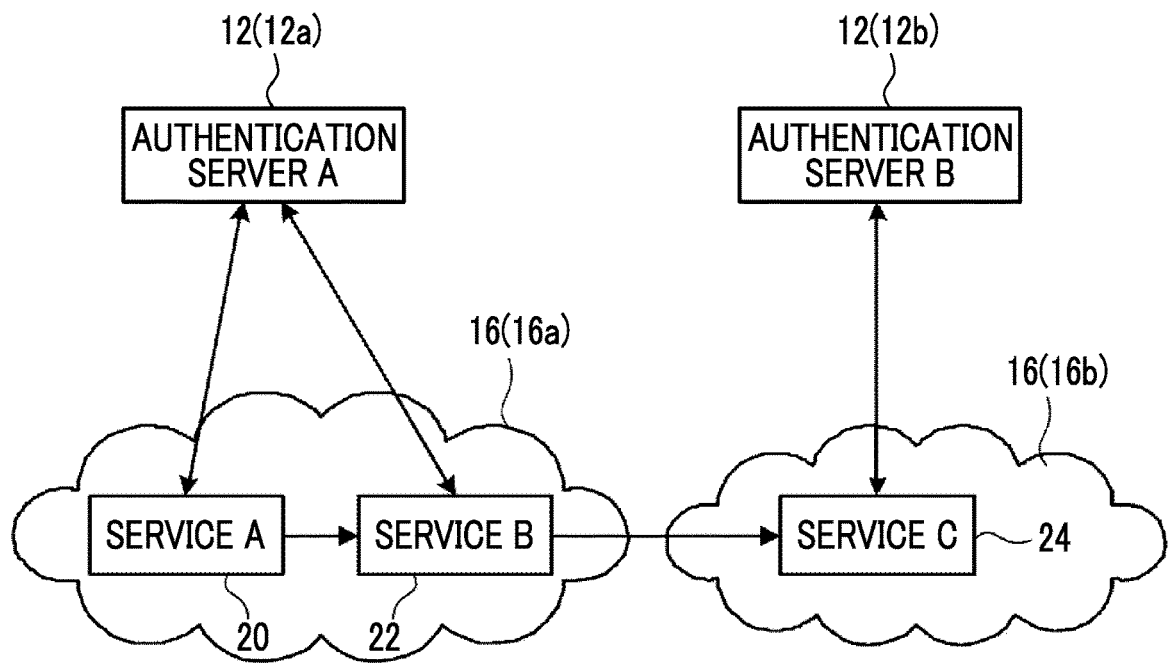
FIG. 3 is a diagram illustrating an example in which different authentication services are required in a case where processing is performed using linking of a plurality of cloud services.

In addition, in a situation where processing is performed using linking of a plurality of cloud services, in a case where different accounts are required for each cloud service, when only apart of the accounts is not registered, linked processing cannot be performed. For example, as illustrated in FIG. 3, it is assumed that a service A 20 and a service B 22 of a cloud server 16a are sequentially executed and then a service C 24 of a cloud server 16b is executed. In a case where an account of an authentication server 12a is required for the service A 20 and the service B 22 and an account of an authentication server 12b is required for the service C 24, when a user does not register only one account of the accounts of the authentication server 12a and the authentication server 12b, the linked processing cannot be performed. In this case, it is necessary to acquire the unregistered account of the authentication server 12 and to instruct again an operation of the linked processing from the beginning.

Therefore, in the information processing system 10 according to the exemplary embodiment, the cloud server 16 includes an execution waiting queue for receiving and storing command information of processing exceeding authority of a temporary user in a case where a cloud service is used. In a case where switching of a temporary user to a regular user is detected, the cloud server 16 executes processing corresponding to the received command information. Thereby, by only performing registration of a regular user, processing corresponding to the requested command information is performed without instructing again an operation for a cloud service after registration of a regular user is performed.

Figure 4:
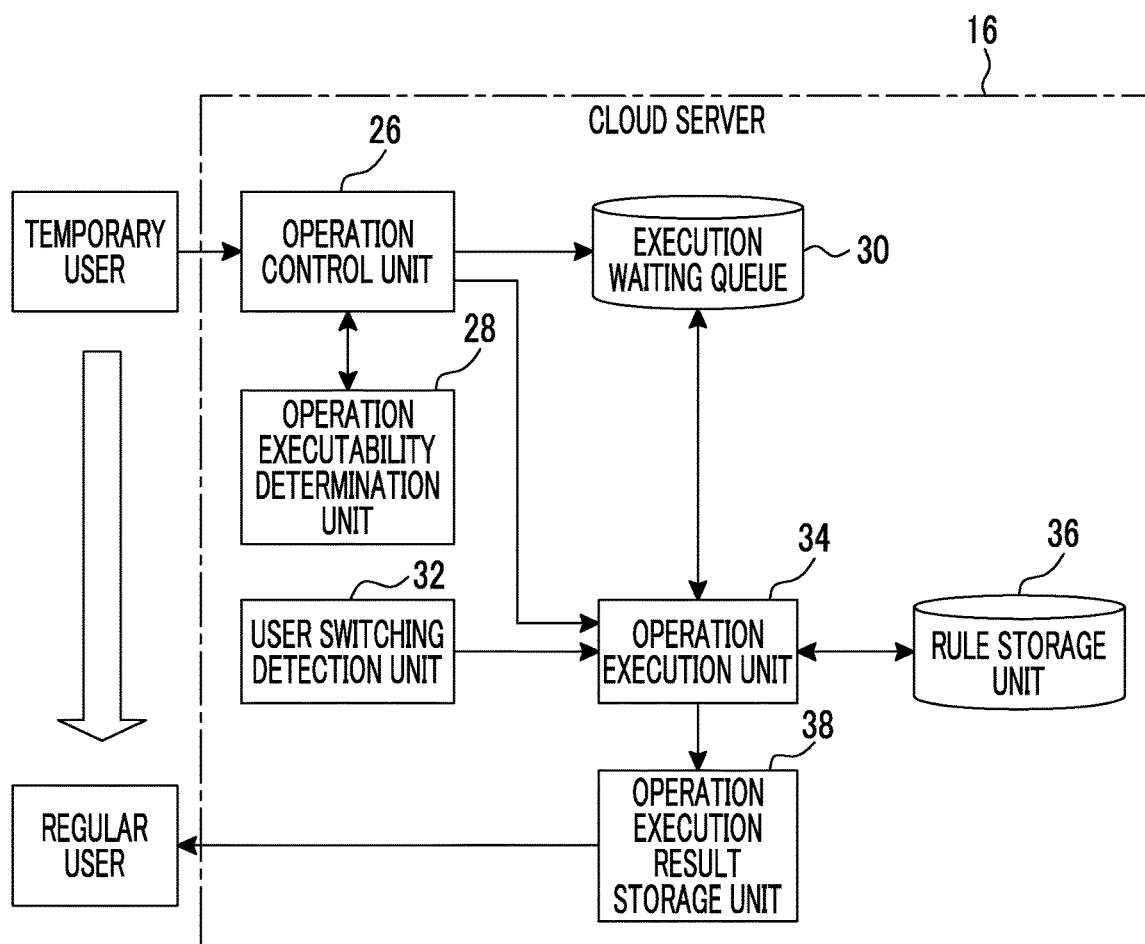
FIG. 4 is a functional block diagram illustrating a configuration of the cloud server of the information processing system according to the exemplary embodiment.

Here, a detailed functional configuration of the cloud server 16 will be described. FIG. 4 is a functional block diagram illustrating a configuration of the cloud server 16 of the information processing system 10 according to the exemplary embodiment.

The cloud server 16 has functions of an operation control unit 26 as a reception unit, an operation executability determination unit 28, an execution waiting queue 30 as a storage unit, a user switching detection unit 32, an operation execution unit 34 as a control unit, a rule storage unit 36, and an operation execution result storage unit 38 as a notification unit.

The operation control unit 26 receives command information indicating an execution of an operation for a cloud service by a temporary user or a regular user. The operation control unit 26 requests the operation executability determination unit 28 to determine executability of the received command information. In a case where the determination result of the executability is "No" and the received command information is an operation by a temporary user, the operation control unit 26 stores the command information in the execution waiting queue 30. On the other hand, in a case where the determination result of the executability is "OK" and the received command information is an operation by a temporary user or an operation by a regular user, the operation control unit 26 requests the operation execution unit 34 to execute the operation.

The operation executability determination unit 28 determines executability of the command information received by the operation control unit 26. For example, the operation executability determination unit 28 determines whether the user is a temporary user or a regular user, determines that the executability is "OK" in a case where the user is a regular user, and notifies the operation execution unit 34 of the determination result. In a case where the user is a temporary user, the operation executability determination unit 28 determines the executability by determining whether the operation contents are within the authority range of the temporary user, and notifies the operation execution unit 34 of the determination result.

The execution waiting queue 30 stores the command information, which is received by the operation control unit 26 and is an operation by a temporary user and of which the executability is "No", in a storage unit such as the RAM 16C or the HDD 16D. As an example of the command information stored in the execution waiting queue 30, command information indicating an execution of an operation as illustrated in FIG. 5 is stored.

The user switching detection unit 32 monitors switching of a temporary user to a regular user, and in a case where switching of a temporary user to a regular user is detected, notifies the operation execution unit 34 of the detection.

Thereby, among pieces of command information received by the operation control unit 26, the command information which is an operation by a temporary user and of which the executability is "OK", and the command information which is an operation by a regular user are not stored in the execution waiting queue 30. Therefore, the operation execution unit 34 performs a control to execute processing corresponding to the command information which is not stored in the execution waiting queue 30 according to a rule stored in the rule storage unit 36, and stores the execution result in the operation execution result storage unit 38.

Further, in a case where the user switching detection unit 32 detects switching of a temporary user to a regular user, the operation execution unit 34 acquires the corresponding command information from the execution waiting queue 30.

The operation execution unit 34 performs a control to execute processing corresponding to the acquired command information according to a rule stored in the rule storage unit 36, and stores the execution result in the operation execution result storage unit 38.

The rule storage unit 36 stores a rule related to an error such as a case where a plurality of pieces of command information are repeated, in advance. As an example of the rule stored in the rule storage unit 36, rules as illustrated in FIG. 6A and FIG. 6B may be used, and the rules are respectively defined by rule information as illustrated in FIG. 7A and FIG. 7B.

FIG. 6A illustrates an example of a rule for discarding the edited contents of a file in a case where command information for editing the file is repeated, and FIG. 7A illustrates an example of rule information indicating the rule for discarding the edited contents of the file in a case where command information for editing the file is repeated. In this example, an example in which two operations (operation ID in FIG. 6A) are repeated is illustrated. FIG. 6A illustrates an example in which two temporary users (execution accounts "tempUser001" and "tempUser002" of FIG. 6A) instruct an "editFile" operation indicating editing of a file as a common operation target (index "file://xxx.doc" of FIG. 6A). In this case, a rule, in which firstly-instructed one command information is executed and the later-instructed command information is discarded, is applied. In this example, execution statuses are both "completion", and no error is presented to the request source in response to the firstly-instructed command information. On the other hand, in response to the later-instructed command information, a message such as "Conflict is detected during execution of editFile. The contents by execution of editFile are discarded." is presented to the request source, as an error.

FIG. 6B illustrates an example of a rule for holding the edited contents of a file in a case where command information for editing the file is repeated, and FIG. 7B illustrates an example of rule information indicating the rule for holding the edited contents of the file in a case where command information for editing the file is repeated. In this example, an example in which two operations (operation ID in FIG. 6B) are repeated is illustrated. FIG. 6B illustrates an example in which two temporary users (execution accounts "tempUser00A" and "tempUser00B" of FIG. 6B) instruct an "editFile" operation indicating editing of a file as a common operation target (index "file://yyy.doc" of FIG. 6B). In this case, a rule, in which firstly-instructed one command information is executed and the later-instructed command information is held, is applied. In this example, execution statuses are both "completion", and no error is presented to the request source in response to the firstly-instructed command information. On the other hand, in response to the later-instructed command information, a message such as "Conflict is detected during execution of editFile. The contents by execution of editFile are held." is presented to the request source, as an error.

In a case where the command information is an operation by a regular user, the operation execution unit 34 executes the command information and stores the execution result in the operation execution result storage unit 38, and the stored execution result is presented to the regular user. In a case where the command information is an operation by a temporary user and is in an execution waiting state, after the temporary user is switched to a regular user, the operation execution unit 34 executes the command information and stores the execution result in the operation execution result storage unit 38, and the stored execution result is presented to the regular user. In addition, in a case where the command information, which is an operation by a temporary user and of which the executability is "No", is stored in the execution waiting queue 30, a fact that the command information exceeding the authority range of the temporary user is held is presented to the request source. At this time, a message prompting switching to a regular user may be presented to the request source.

Next, specific processing performed by the cloud server of the information processing system 10 with the configuration according to the exemplary embodiment will be described. FIG. 8 is a flowchart illustrating an example of a flow of processing performed by the cloud server 16 of the information processing system 10 according to the exemplary embodiment. The processing of FIG. 8 is started, for example, in a case where the operation control unit 26 receives the command information from a user.

In step 100, the operation control unit 26 acquires authority information of a user from whom the received command information is requested, and the process proceeds to step 102. For example, the operation control unit 26 acquires identification information or the like of the user from the authentication server 12, thereby acquiring registration information indicating whether the user is a temporary user or a regular user, as the authority information.

In step 102, the operation executability determination unit 28 determines whether or not the command information is non-executable based on the authority information. In a case where the determination result is No, that is, in a case where the user as a request source of the command information is a regular user or in a case where the command information is within the authority range of the temporary user, the process proceeds to step 112. In a case where the determination result is Yes, that is, in a case where the user as a request source of the command information is not a regular user or in a case where the command information exceeds the authority range of the temporary user, the process proceeds to step 104.

In step 104, the operation control unit 26 stores, in the execution waiting queue 30, the command information of which the executability is determined as "No" by the operation executability determination unit 28, and the process proceeds to step 106.

In step 106, the operation execution result storage unit 38 presents an execution status to the user as the request source, and the process proceeds to step 108. For example, in a case where the user is a temporary user and the command information includes operation contents exceeding the authority range of the temporary user, a fact that the command information exceeding the authority range of the temporary user is held may be presented to the request source. At this time, a message prompting switching to a regular user may be presented to the request source.

In step 108, the user switching detection unit 32 monitors switching of the authority of the command information stored in the execution waiting queue 30, and the process proceeds to step 110. That is, the user switching detection unit 32 detects whether the user corresponding to the command information stored in the execution waiting queue 30 is switched to a regular user.

In step 110, the user switching detection unit 32 determines whether or not switching to allowable authority is performed, that is, in the exemplary embodiment, whether or not switching to a regular user is performed. In a case where the determination result is No, the process returns to step 108 to continue monitoring of the authority of the user, and in a case where the determination result is Yes, the process proceeds to step 112.

In step 112, the operation execution unit 34 executes processing corresponding to the command information according to the predetermined rule stored in the rule storage unit 36, and the process proceeds to step 114. That is, the operation execution unit 34 executes cloud service processing corresponding to the command information, and stores the execution result in the operation execution result storage unit 38.

In step 114, the operation execution result storage unit 38 presents the execution result obtained by executing the command information to the user as the request source, and a series of processing is ended. For example, the operation execution result storage unit 38 presents the execution result of the command information by transmitting the execution result obtained by executing the command information to the information processing terminal 14 or the like of the user as the request source.

By performing the processing as described above, even in a case where an operation exceeding the authority of the temporary user is requested to the cloud service, the cloud server 16 temporarily stores the command information in the execution waiting queue 30. Then, in a case where switching from a temporary user to a regular user is detected, processing corresponding to the stored command information is performed. Therefore, it is possible to perform processing corresponding to the command information without instructing again an operation for a cloud service after registration to a regular user is performed.

In the exemplary embodiment, although an example in which the authentication server 12 and the cloud server 16 are separately provided is described, the cloud server 16 may have the functions of the authentication server 12.

In addition, although the processing performed by the cloud server 16 according to the exemplary embodiment is described as processing performed by software, the processing by the cloud server 16 may be performed by dedicated hardware or by a combination of software and hardware. The processing to be performed by the cloud server 16 may be distributed by being stored in a storage medium as a program.

The present invention is not limited to the exemplary embodiment, and various modifications may be made without departing from the spirit of the inventions.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a processor, configured to:
   receive command information related to an operation by a temporary user;
   determine whether the operation corresponding to the command information is included in a predetermined authority range of the temporary user;

in a case where the operation corresponding to the command information is not within the predetermined authority range of the temporary user, store the command information in an execution waiting queue;

in response to the temporary user being switched to a user with an authority range in which the command information is included, perform a control to execute the operation corresponding to the command information stored in the execution waiting queue according to a predetermined rule related to an error; and wherein, in a case where the operation corresponding to the received command information is performed and a plurality of pieces of the command information related to the temporary user and another temporary user are repeated, the processor notifies the error according to the predetermined rule.

2. The information processing apparatus according to claim 1, wherein, in a case where the operation corresponding to the command information is within the predetermined authority range of the temporary user, the processor performs a control to execute the operation corresponding to the command information without storing the command information in the execution waiting queue.

3. The information processing apparatus according to claim 2, wherein the processor is further configured to:

notify an execution status of the operation corresponding to the command information in a case where the command information is received.

4. The information processing apparatus according to claim 3, wherein, in a case where the authority is not switched after the command information not within the predetermined authority range of the temporary user is received, the processor notifies that the operation corresponding to the received command information is unexecuted, as the execution status.

5. The information processing apparatus according to claim 4, wherein the processor further notifies that switching of the authority of the temporary user is promoted, in addition to the notification indicating that the operation corresponding to the received command information is unexecuted.

6. The information processing apparatus according to claim 3, wherein, a case where an execution of the operation corresponding to the received command information is completed, the processor notifies that the requested operation is completed, as the execution status.

7. The information processing apparatus according to claim 1, wherein the processor is further configured to:

notify an execution status of the operation corresponding to the command information in a case where the command information is received.

8. The information processing apparatus according to claim 7, wherein, in a case where the authority is not switched after the command information not within the predetermined authority range of the temporary user is received, the processor notifies that the operation corresponding to the received command information is unexecuted, as the execution status.

9. The information processing apparatus according to claim 8, wherein the processor further notifies that switching of the authority of the temporary user is promoted, in addition to the notification indicating that the operation corresponding to the received command information is unexecuted.

10. The information processing apparatus according to claim 8, wherein, in a case where an execution of the operation corresponding to the received command information is completed, the processor notifies that the requested operation is completed, as the execution status.

11. The information processing apparatus according to claim 7, wherein, in a case where an execution of the operation corresponding to the received command information is completed, the processor notifies that the requested operation is completed, as the execution status.

12. The information processing apparatus according to claim 1, wherein a firstly-instructed command information among the plurality of pieces of the command information related to the temporary user and the another temporary user being repeated is executed, and wherein the plurality of pieces of the command information other than the firstly-instructed command information are discarded.

13. The information processing apparatus according to claim 1, wherein a firstly-instructed command information among the plurality of pieces of the command information related to the temporary user and the another temporary user being repeated is executed, and wherein the plurality of pieces of the command information other than the firstly-instructed command information are held.

14. An information processing system comprising:

an information processing apparatus comprising a processor, wherein the processor is configured to:

receive command information related to an operation by a temporary user;

determine whether the operation corresponding to the command information is included in a predetermined authority range of the temporary user;

in a case where the operation corresponding to the command information is not within the predetermined authority range of the temporary user, store the command information in an execution waiting queue;

in response to the temporary user being switched to a user with an authority range in which the command information is included, perform a control to execute the operation corresponding to the command information stored in the execution waiting queue according to a predetermined rule related to an error; and in a case where the operation corresponding to the received command information is performed and a plurality of pieces of the command information related to the temporary user and another temporary user are repeated, notify the error according to the predetermined rule;

an information processing terminal that allows the user to transmit the command information to the information processing apparatus; and an authentication apparatus that performs authentication of the user for switching the authority of the user.

15. A non-transitory computer readable medium storing an information processing program for causing a computer to:
- receive command information related to an operation by a temporary user;
- determine whether the operation corresponding to the command information is included in a predetermined authority range of the temporary user;
- in a case where the operation corresponding to the command information is not within the predetermined authority range of the temporary user, store the command information in an execution waiting queue;
- in response to the temporary user being switched to a user with an authority range in which the command information is included, perform a control to execute the operation corresponding to the command information stored in the execution waiting queue according to a predetermined rule related to an error; and
- in a case where the operation corresponding to the received command information is performed and a plurality of pieces of the command information related to the temporary user and another temporary user are repeated, notify the error according to the predetermined rule.

* * * * *